United States Patent
Conklin et al.

(10) Patent No.: US 6,444,253 B1
(45) Date of Patent: Sep. 3, 2002

(54) FLAVOR DELIVERY SYSTEM

(75) Inventors: Garry K. Conklin, Pequannock; Klaus J. Bauer, Little Silver; Michelle E. Huber, Rivervale; Eberhard Suessle, West Caldwell, all of NJ (US)

(73) Assignee: DRAGOCO Gerberding & Co. AG (DE)

( * ) Notice: Subject to any disclaimer, the term of this patent is extended or adjusted under 35 U.S.C. 154(b) by 0 days.

(21) Appl. No.: 09/559,716

(22) Filed: Apr. 26, 2000

(30) Foreign Application Priority Data

Aug. 18, 1999 (EP) .............................. 99116251

(51) Int. Cl.⁷ .............................................. A23L 1/222
(52) U.S. Cl. ..................... 426/651; 426/534; 426/650; 426/654
(58) Field of Search ................. 426/651, 650, 426/534, 535, 536, 537, 538, 654, 662

(56) References Cited

U.S. PATENT DOCUMENTS

| | | | |
|---|---|---|---|
| 4,343,823 A | * 8/1982 | Todd, Jr. et al. ............. | 426/250 |
| 4,835,002 A | * 5/1989 | Wolf et al. ................... | 426/590 |
| 5,320,863 A | * 6/1994 | Chung et al. ................ | 426/650 |
| 5,607,715 A | * 3/1997 | Beharry et al. .............. | 426/604 |

* cited by examiner

*Primary Examiner*—Leslie Wong
(74) *Attorney, Agent, or Firm*—Pendorf & Cutliff

(57) ABSTRACT

An anhydrous flavor delivery system being a clear liquid at a temperature of 30° C. which can be used to produce finished drinks and foods wherein the flavors are unexpectedly stabilized against flavor degradation and off note development. The flavor delivery system contains (a) 10–40% by weight of a flavoring composition, (b) 20–50% by weight of a surfactant system consisting essentially of one or more surfactants, (c) 20–50% by weight of an alcoholic composition consisting essentially of one or more alcohols with two or more hydroxy groups per molecule, wherein the total amount of ingredients (a), (b), and (c) is at least 90% by weight. The flavor delivery system can be obtained by (a) mixing corresponding amounts of said flavoring and said surfactant system, (b) adding a corresponding amount of said alcoholic composition to the mixture obtained by step (a), and (c) mixing the admixture obtained by step (b).

11 Claims, No Drawings

FLAVOR DELIVERY SYSTEM

The present invention concerns a flavor delivery system which can be used to produce finished drinks and foods wherein the flavors are unexpectedly stabilized against flavor degradation and off note development.

BACKGROUND OF THE INVENTION

1. Field of the Invention

The flavorants which are to be used in the flavor delivery system of the present invention include in particular edible, or essential, oils. While it is well known to extract these essential oils from plants and meat, they are generally sensitive to air and temperature, and have a short life. It has been difficult to preserve these oils as flavorants in stable form in end products such as fruit drinks where a considerable time may elapse between formulation and consumption of the end product. While the problem is often circumvented by resorting to stable artificial flavors and fragrances, there remains a consumer preference for natural flavors and fragrances.

Natural flavorant oils are generally provided In the form of emulsions. Emulsions, including microemulsions, are usually classified as oil and/or fat emulsified in water (O/W) or water emulsified In oil and/or fat

2. Description of the Related Art

For example, U.S. Pat. No. 5,320,863 entitled "Transparent oil-in-water microemulsion flavor concentrate" (Chung et al) teaches a stable transparent oil-in-water microemulsion concentrate consisting essentially of:

(i) water; (ii) one or more hydrophobic flavor or fragrance oils; and (iii) one or more surfactants wherein the mixing ratio of the water, oil and surfactant is, within a specified range shown in FIG. 1A. Also described is a process for preparing such transparent microemulsion compositions, a mouthwash containing said transparent microemulsion compositions, a process for preparing same, and a perfume composition containing said transparent microemulsion compositions.

U.S. Pat. No. 4,835,002 entitled "Microemulsions of oil in water and alcohol" (Wolf) teaches microemulsions of flavor oils in a matrix of water for use in certain products such as beverages. The microemulsions contain 25–80 wt. % alcohol (such as propylene glycol), 1–30 wt. % edible surfactant (such as Tween 60) and 1–25 wt. % essential oil, and the balance water to make 100 wt. %. The alcohol may be ethanol, propylene glycol, glycerin, sugar, sugar alcohol, and mixtures thereof. The microemulsions are indicated to be microbiologically and thermodynamically stable for long periods of time under ambient conditions of storage and use. However, water is an indispensable part of this microemulsion, and the ratio by weight of alcohol to surfactant is 8:1 to 20:1.

There remains a need for a more stable, non-aqueous flavor delivery system. Systems containing water are not desirable in some food products. To give a first example, microwave popcorn consists of a mix of corn, salt, oil and flavorings. It is not desirable to add flavors (usually needed at a high level in this product) that contain water to this product. To give a second example, in the manufacture of dry systems (such as beverage powders) the addition of flavors that contain water is not desirable.

Non-liquid forms of flavor delivery systems are known. U.S. Pat. No. 4,232,047 entitled "Food supplement concentrate in a dense glasseous extrudate" (Sair, et al.) teaches a food supplement concentrate of an ingestible agent such as a seasoning, flavoring, oleoresin, essential oil, vitamin, mineral, and mixtures thereof encapsulated, enveloped or otherwise encased as a dispersed microphase within but recoverable from a matrix of encapsulating medium such as a starch, protein, flour, modified starch, gum, and mixtures thereof. The glass-like, unexpanded extrudate is reported to be an excellent matrix for the incorporation of a mixture of lemon flavoring and citric acid. However, the product must be exposed to hot (boiling) water to release of the flavor.

U.S. Pat. No. 4,888,186 entitled "Method for producing flavored popcorn" (Cooley et al) teaches a fat-flavor system prepared by dry-blending solid particles of fat (preferably a partially hydrogenated vegetable oil such as cottonseed, soybean and mixtures thereof) with a flavoring. The fat has a melting point of no less than about 95° F. so that the fat-flavor system comprises free-flowing particles at room temperature. The fat-flavor system is sprinkled onto hot, popped corn wherein the fat melts and the flavoring is adhered to the popcorn producing a flavored popcorn having an even flavor distribution and without a waxy-mouth feel. This system is not designed for delivering heat or oxidation sensitive ingredients such as citric acid, is not readily incorporated into a drink or food, and is not a liquid at room temperature.

It is also known to micro-encapsulate flavor oils: however, this method is complex and expensive In terms of requirements in skilled labor and materials.

U.S. Pat. No. 4,343,823 entitled "Liquid seasoning compositions IV" (Todd et al) teaches a homogeneous liquid condimental composition, useful in flavoring or coloring foods and beverages and which is dispersible in both oil and water, consisting essentially of (1) monoglyceride of caproic and/or caprylic and/or lauric acid, (2) polyglycerol ester of at least one fatty acid, and (3) one or more condiments selected from edible flavorings and edible colorings, the ratio by weight of (1) plus (2) to (3) being at least 1:4, preferably at least 1:3, especially about 1:1, the condiment portion (3) preferably comprising at least one condiment selected from the group consisting of (a) spice oleoresins, (b) essential oils, and (c) edible colorings, the ratios by weight of (2) to (1) preferably being between about 1:3 and 3:1, and the condiment portion (3) preferably comprising oleoresin black pepper.

Flavored oils are well known, but these are not what is referred to herein as a flavor delivery system. For example, U.S. Pat. No. 5,320,862 entitled "Edible, multipurpose flavored oil substantially free of flavoring agent particles" (La Tona) teaches a method for preparing a pre-flavored oil substantially free of flavoring agent in a particulate form. In accordance with the method of this invention, a vegetable or nut oil is contacted with a garlic or onion flavoring agent in a particulate form at a temperature between 100° C. and 200° C. for 15 minutes to 90 minutes. After this heating period flavoring agent in particulate form is removed from the oil. This system thus provides a flavored cooking oil, not a concentrated flavor delivery system.

U.S. Pat. No. 5,607,715 entitled "Flavored cooking oil having reduced room aroma" (Beharry et al) disclosed flavored oils for use in deep frying, stir-frying and marinating, which when heated, exhibit reduced aroma. The flavored oils consist essentially of an edible oil (98.5%–99.94%), a flavoring agent (0.01% to 1%) and a polyoxyethylene sorbitan monoester such as Tween 80 (0.05 to 0.5%) incorporated in the edible oil but not the flavoring. This composition would be referred to as a flavored cooking oil, not a concentrated flavor delivery system.

SUMMARY OF THE INVENTION

The present invention was made and based on the surprising discovery that an anhydrous flavor delivery system being liquid at a temperature of 30° C. can be produced by combining (a) 10–40% by weight of a flavoring composition,
(b) 20–50% by weight of a surfactant system consisting essentially of one or more surfactants,
(c) 20–50% by weight of an alcoholic composition, consisting essentially of one or more alcohols with two or more hydroxy groups per molecule, and, optionally,
(d) up to 10% by weight of at least one other additive typically used in flavor and/or food manufacturing, wherein the total amount of ingredients (a), (b), and (c) is at least 90% by weight.

In the above definition, the term "surfactant system" characterizes individual, or combinations of, surfactants, and the term "alcoholic composition" characterizes individual, or combinations of, (polyhydric) alcohols.

Although the term "Microemulsion" might be a proper term for describing the flavor delivery system of the present invention, it is not used hereafter as it implies the presence of water. In the flavor delivery system of the present invention it is the alcoholic composition which constitutes the continuous or outer phase, and the flavoring composition constitutes the inner phase.

The anhydrous flavor delivery system according to the present invention is usually obtained by
(a) mixing corresponding amounts of said flavoring and said surfactant system (typically the flavoring ingredient is added to the surfactant),
(b) adding a corresponding amount of said alcoholic composition to the mixture obtained by step (a), and
(c) mixing the admixture obtained by step (b).

In comparison with the edible concentrated microemulsion disclosed In the U.S. Pat. No. 4,835,002 (Wolf) the flavor delivery system according to the present invention advantageously comprises no water, which is known to be, even in very small amounts, a catalyst for chemical reactions including hydrolysis and subsequent oxidation adversely effecting flavorants.

Furthermore, in comparison with the U.S. Pat. No. 4,835,002 (Wolf) the weight ratio of the alcoholic composition and the surfactant system is considerably lower in the flavor delivery system of the present invention. According to the present invention said alcoholic composition and said surfactant system are present in a weight ratio to each other in the range of 0.4–2.5, whereas according to the U.S. Pat. No. 4,835,002 the weight ratio of alcohol and surfactant is in the range of about 6–20. Surprisingly, it has been found that a self-stabilized flavor delivery system can be obtained in absence of water, when the flavor delivery system contains a large enough portion of said surfactant system.

Furthermore, again in comparison with the U.S. Pat. No. 4,835,002 (Wolf) it was surprisingly found that only alcohols with two or more hydroxy groups per molecule can be successfully used in producing an anhydrous flavor delivery system according to the present invention. Monovalent alcohols like ethanol can not be used successfully.

DETAILED DESCRIPTION OF THE INVENTION

Advantageously, the anhydrous flavor delivery system according to the present invention tolerates high levels of acids, even incorporation of pure acids at high levels (see Example 8 below).

In the anhydrous flavor delivery system according to the present invention said surfactant and said flavoring composition are present in a weight ratio to each other of about 0.5–5.

Preferably, the anhydrous flavor delivery system according to the present invention comprises between 15 and 30% by weight of said flavoring composition. I.e. said surfactant system and said flavoring composition are present in a weight ratio to each other of preferably 0.66–3.33.

The main components of the anhydrous flavor delivery system according to the invention will now be individually discussed in greater detail.

Flavoring Composition:

The flavoring composition comprises one ore more flavorants selected from the following group:
(a) essential oils
(b) taste contributing alcohols comprising between three and sixteen carbon atoms per molecule and containing only one hydroxyl group per molecule,
(c) aldehydes comprising between three and sixteen carbon atoms per molecule,
(d) organic acids comprising between three and sixteen carbon atoms per molecule,
(e) organic esters comprising between three and sixteen carbon atoms per molecule,
(f) lactones of the general formula $C_xH_{2x-2}O_2$ comprising between five and eighteen carbon atoms per molecule, and
(g) ketones comprising between four and fourteen carbon atoms per molecule.

The essential oils mentioned as subgroup (a) above include flavoring aromatic compounds and/or oils, oleoresins and extracts derived from plants, leaves, flowers, fruits and so forth, and combinations thereof. These flavoring oils may be used individually or In a mixture as is well known in the art.

The edible, or essential, oils derived from plant matter are obtained from various parts of the plants from which they obtained, i.e., leaves, fruit, bark, root, grass, wood, heartwood, gum, balsam, berries, seed, flowers, twigs, and buds (Giovanni Fenaroli, "Handbook of Flavor Ingredients," volume 1 (Natural), Volume 2 (Synthetic), CRC Press, 1971; S. Arctander, "Perfumes & Flavor Chemicals," Montclair, N.J., 1969, 2 volumes).

The edible oils include all those natural edible oils normally extracted, as such, from their plant matter or animal source, usually, but not exclusively, by steam distillation, and without any dilution in a solvent or carrier. Artificial or synthetic forms of the natural edible oils may also be used.

These essential oils would include all those disclosed by S. Arctander and G. Fenaroli, supra, which are the more tasteful types of edible oils, and tend to be liquid at about 20–25° C., and including those set forth in Table 1.

TABLE 1

Angelica (*Angelica archangelica*)
Anise (*Pimpinella anisum*)
Star Anise (*Illicium verum*)
Basil (*Ocimum basilicum*)
Reunion Basil (*O. basilicum*)
East Indian Basil (*O. gratissimum*)
Halry Basil (*O. canum*)
Bay (*Laurus nobilis*)
West Indies BAY (*Pimenta Racemosa*)
Bay Rum Tree (*Pimenta racemosa*)
Allspice (*P. dioica*)
Benzoin (*Styrax benzoin*)
Balsam of Tolu (*Myroxylon balsamum*)
Balsam of Peru (*M. balsamum* var. *Pereirae*)
Styrax (*Liquidamber orientalis*)
Bergamot (*Citrus bergamia*)
Birch (*Betula lenta*)
White Birch (*B. alba*)

TABLE 1-continued

Wintergreen (*Gaultheria procumbens*)
Calendula (*Calendula officinalis*)
Marigold (*Tagetes m? nuta and T. patuh*)
Caraway (*Carum carvi*)
Cardamom (*Elettaria cardamomum*)
Carrot Seed (*Daucus carota*)
Caulophyllum Inophyllum
Cedarwood (*Cedrus species*)
Moroccan Cedar (*C. Libani*)
Atlas Cedar (*C. atlantica*)
Tibetan Cedarwood (*C. deodara*)
Thuja (*Thuja occidentalis*)
CeJery (*Apium graveolens*)
Chamomile, German (*Matricaria recutita*, formerly *M. chamomilla*)
Chamomile, Roman (*Chamaemelum nobile*, formerly *Anthemis nobilus*)
English Camomile (*Anthemis nobils*)
Ormenis (*Chamaemelum mixtum*, formerly *Anthemis mixta* and sometimes *Ormenis mixta* or *O. multicaulis*)
Artemisia Arborescens (*Artemisia rborescens*)
Cinnamon (*Cinnamomum zeylanicum*)
Cassia (*C. cassia*)
Ceylon Cinnamon (*C. verum*)
Camphor (*C. camphora*)
Borneo (Borneol) Camphor (*Dryobalanops aromatica*)
Clary Sage (*Salvia sclarea*)
Clove Bud (*Syzygium aromaticum*, formerly *Eugenia caryophyllata*)
Clove Bark (*Dicypellium caryophyllatum*)
Coriander (*Coriandrum sativum*)
Cumin (*Cuminum cyminun*)
Cypress (*Cupressus sempervirens*)
Eucalyptus (*Eucalyptus globulus*)
Eucalyptus Australiana (*E. australiana*)
Lemon Eucalyptus (*E. citriodora*)
Dives or Broad-Leaved Peppermint (*E. dives*)
Peppermint Eucalyptus (*E. piperita*)
Blue Mallee (*E. polybractea*)
Grey Peppermint (*E. radiata*)
Gully Gum (*E. smithii*)
Fennel (*Foeniculum vulgare*)
Dill (*Anethum graveolens*)
Fir (*Abies alba* and other species)
Canadian Balsam (*A. balsamea*)
Siberian Fir (*A. siberica*)
Hemlock (*Tsuga canadensis*)
Pine (Pinus species)
Black Spruce (*Picea mariana*)
Terebinth (*P. palustris*, etc.)
Frankincense (*Boswellia carterii*)
Olinbaum (*B. papyrifera*)
Elemi (*Canarium luzonicum*)
Galbanum (*Ferula galbaniflua*)
Asafetida (*F. asafoetida*)
Zalou Root (*F. hermonic*)
Musk Root (*F. sumbal* and *F. gummose*)
Silhion (F. species)
Geranium (*Pelargonium graveolens*)
Zdravets (*Geraniurm macrorhizum*)
Ginger (*Zingiber officinale*)
Galanga (*Alpina officinalis*)
Helichrysum (*Helichrysum angustifolium*)
Hyssop (*Hyssopus officinalis*)
Hyssop (*H. officinalis* var. *decumbens*)
Inula, Sweet (*Inula graveolens*, or *I. odorata*)
Inula (*I. helenium*)
Jasmine (*Jasminum officinale* and *J. grandiflorum*)
Jasmine Sambac (*Jasminun officianalis sambac*)
Chinese Jasmine (*J. sambac*)
Juniper (*Juniperus communis*)
Cedarwood, Virginia (*J. virgiiana*)
Oil of Cade (*Juniper Tar*)
Labdanum (*Cistus labdaniferus*)
Cistus (*C. incanus*)
Lavender (*Lavandula angustifolia*, previously *L. vera* and *L. officinale*)
Lavandin (*L. x intermedla* or *L. x hybrida*)
Spike Lavender (*L. latifolia*)
Stoechas Lavender (*L. stoechas*)
Lemon (*Citrus limon*)
Cedro Oil
Lemongrass (*Cymbopogan citratus*)

TABLE 1-continued

Palmarosa (*C. martini*)
Petitgrain (*Citrus aurantium*)
Ravensara Aromatica (*Cinnamomum camphora*)
Lemongrass Cochin (*C. flexuosus*)
Citronella (*C. nardus*)
Java Citronella (*C. winterianus*)
Lovage (*Levisticum officinale*)
Marjoram (*Origanum marjorana* or *Marjorana hortensis*)
Oregano (*O. vulgare*)
Spanish Marjoram (*Thymus mastichina*)
Spanish Oregano (*T. capitatus*)
Melissa (*Melissa officinalis*)
Lemon Verbena (*Aloysia triphylla*, formerly *Lippia citriodora*)
Mimosa (*Acacia decurrens* var. *dealbata*)
Cassie (*A. farnesiana*)
Myrrh (*Commiphora myrrha*)
Opopanax (*Illicium verum*)
Copaiba Balsam (*Copaiba officinalis*)
Myrtle (*Myrtus communis*)
Nutmeg (*Myristica fragrans*)
Niaouli (*Melaleuca viridflora*)
Palma Rosa (*Cymbapogon Martini*)
Oakmoss (*Evernia prunastri*)
Tree Moss (*E. furfuracea*)
Orange (*Citrus sinensis*, Citrus aurantium)
Neroli (*Citrus aurantium*)
Neroli Portugal (*C. aurantium* var. *dulcis*)
Neroli sur Petitgrain (*Citrus aurantiumflowers*)
Bergamot (*Citrus bergamia*)
Bitter Orange (*C. aurantium* var. *amara*)
Grapefruit (*C. x paradisi*)
Mandarine (*Citrus nobilis*)
Tangerine (*Citrus reticulata*)
Pink Grapefruit (*Citrus paradisii*)
Lime (*C. aurantiifolia*)
Orange Blossom (*Neroli, Citrus aurantium* var. *amara*)
Patchouli (*Pogostemon cablin*)
Pepper, Black (*Piper nigrum*)
Litsea (*Litsea cubeba*)
Cubeb (*Piper cubeba*)
Californla Pepper Tree (*Schinus moule*)
Mastic (*Pistacia lentiscus*)
Peppermint (*Mantha piperita*)
Ravensare (*Ravensara aromatica*)
Rose Otto (*Rosa damascena*, *R. gallica*, and others)
Cabbage Rose (*R. centifolia*)
Rosemary (*Rosmarinus officinalis*)
Rosmarinus Pyramidalis (*R. pyramidalis*)
Rosewood (*Aniba rosaeodora*)
Sage (*Salvia officinalis*)
Spanish Sage (*S. lavandulaefolia*)
Sandalwood (*Santalum album*)
Spearmint (*Mentha Spicata*)
Black Spruce (*Picia Mariana*)
Tagetes (*Tagetes glandulifera*)
Amyris (*Amyris balsamifera*)
Spikenard (*Nardostachys jatamansi*)
Valerian (*Valeriana officinalis*)
Kesso Root (*V. officinalis* var. *latifolia*)
Tea Tree (*Melaleuca alternifolia*)
Cajeput (*M. cajuputii*, *M. quinquenervia*)
Niaouli (*M. viridiflora*)
Thyme (Red Thyme, White Thyme) (*Thymus vulgaris*)
THYME, var LINALOL (*Thymus vulgaris linalool*)
Moroccan Thyme (*T. satureioides*)
Spanish Marjoram (*T. mastichina*)
Spanish Oregano (*T. capitatus*)
Tuberose (*Polianthes tuberosa*)
Vanilla (*Vanilla planifolia*)
Vetiver (*Vetiveria zizanoides*)
Violet (*Viola adorata*)
Orris (*Iris germanica* var. *florentina*)
Yarrow (*Achillea millefolium*)
Ylang-Ylang (*Cananga odorata*)
Champac (*Michelia champaca*)
Cajeput (*Melaleuca leucadendron*)
Cistus (Rock Rose) (*Cistus landaniferus*)
Clary Sage (*Salvia sclarea*)
Clove Rud (*Eugenia carophyllata*)

TABLE 1-continued

Elemi (*Canarium luzonicum*)
Fir Needle (*Abies balsamea canadensis*)
Rose Geranium (*Pelargonium roseum*)
Helichrysum (*Helichrysum Italicum, Helichrysum augustifolia*)
Lavandin, Super (*Lavandula hybrid* var. *super*)
Manuka (*Leptospermum scoparium*)

and other essential oils used in beverages and foods for flavors such as coffee, tea, cherry, apple, pineapple, and vanilla.

The useful oils would also include those which are relatively tasteless, or not normally used as essential oils for taste-imparting purposes. These less tasteful oils are, for the most part glyceride based, saturated or unsaturated, materials which are liquids, or pourable, at temperatures in the range of about 20° to 75° C., and are derived from plant or animal (warm- or cold-blooded) sources.

Such relatively tasteless oils derived from plant sources would include fruit, or vegetable or nut derived oils such as olive oil, corn oil, soyabean oil, sunflower seed oil, peanut oil, coconut oil, safflower oil, palm kernel oil, cocoa butter, palm oil, cottonseed oil, sesame seed oil, rapeseed oil, linseed oil, and castor oil.

Such relatively tasteless oils derived from warm blooded animal sources would include butter fat, lard (hogs) tallow (cattle and sheep), and whale oil, and those derived from cold blooded animal sources would include fish liver oils and sardine oils.

The oils may be used individually: or in mixtures of two or more thereof in the flavor delivery system of the present invention.

The flavorants prefered are those from the subgroups (a)–(g) which are liquid at room temperature. However, flavorant powders and the like (e.g. vanillin powder) can be integrated in the flavor delivery system according to the present invention in at least an amount which corresponds to their solubility in the admixture of the other components of the flavoring composition. Solid flavorants (powders) which have a very high solubility in the corresponding alcoholic composition of a flavor delivery system according to the present invention can even be included into said flavor delivery system in excess of their solubility in the other components of the flavoring phase.

Surfactant System:

The surfactant system, which is present in an amount of 20–50% by weight in the anhydrous flavor delivery system according to the present invention, preferably comprises one or more non-ionic-surfactants. As already mentioned above, the term "surfactant system" characterizes Individual, or combinations of, (preferably non-ionic) surfactants.

The non-ionic surfactants used in the practice of invention can be selected from those well known in the art as non-ionic surfactants employed In the flavor and/or food industry.

Favorably, the composite hydrophilic/lipophlc balance (HLB) value of the surfactant system is between 6 and 18, preferably between 9 and 18.

Surfactants which have HLB values which are outside these ranges may be blended with each other and/or with surfactants having HLB values which are within such ranges, as long as the HLB value of the composite blended surfactant system has a HLB value within that of the desired ranges of values. The HLB value of such combinations of surfactants would be calculated or determined the same way as are the HLB values for the individual surfactants.

The HLB value concept of, and determination thereof for, surfactants is disclosed by Milton J. Rosen in "Surfactants & Interfacial Phenomena", J. Wiley & Sons, New York, N.Y., 1978, pages 242–245 or by Kirk-Othmer, Encyclopedia of Chemical Technology, 3rd Edition, Vol. 8, 1979, at pages 910–915.

The respective listings of HLB values by these authors may, in some cases, provide slightly different numerical HLB values, or ranges therof, for the same surfactants, due to differences in the respective measuring techniques used by such authors. Each of such respective ranges or values, however, is useful for the purposes of the present Invention.

Examples of suitable surfactants include the following:

TWEEN® 20 (Polyoxyethylene (20) Sorbitan Monolaurate) (TWEEN® is a Trademark of ICI Americans of Wilmington, Del.);

TWEEN® 40 (Polyoxyethylene (20) Sorbitan Monopalmitate);

TWEEN® 60 (Polyoxyethylene (20) Sorbitan Monostearate);

CREMOPHOR® RH 40 (Ethoxy Hydrogenated Castor Oil) (CREMOPHOR® is a Trademark of BASF Aktiengesellschaft of D-6700 Ludwigshafen, Federal Republic of Germany);

CREMOPHOR® RH 60 (Ethoxy Hydrogenated Castor Oil);

GENAPOL® (Alcohol Polyglycol Ether) (GENAPOL® is a trademark of Hoechst Aktiengesellschaft of D-6230 Frankfurt AM Main No. 90, Postfach 80, Federal Republic of Germany);

TRYCOL brand surfactants available from Henkel Corp./Emery Group, Ohio.

TERGITOL surfactents made by Union Carbide Corp., Conn.

Further suitable surfactants are given in the Examples below.

Nonionic surfactants are typically compounds-produced by the condensation of alkylene oxide groups (hydrophilic in nature) with an organic hydrophobic compound, which can be aliphatic or alkyl-aromatic in nature, but can include other surfactants that do not possess a charge group. The length of the hydrophilic or polyoxyalkylene radical which is condensed with any particular hydrophobic group can be readily adjusted to yield a water-soluble compound having the desired degree of balance between hydrophlic and hydrophobic elements.

For example, surfactants can be formed by condensing ethylene oxide with a hydrophobic base formed by the condensation of propylene oxide with propylene glycol. The hydrophobic portion of the molecule which, of course, exhibits water insolubility has a molecular weight of from about 1,500 to about 1,800. The addition of polyoxyethylene radicals to this hydrophobic portion tends to increase the water solubility of the molecule as a whole and the liquid character of the products is retained up to the point where polyoxyethylene content is about 50% of the total weight of the condensation product.

Examples of classes of nonionic surfactants are:

Alkyl phenol ethoxylates. The polyethylene oxide condensates of alkyl phenols, e.g., the condensation products of alkyl phenols having an alkyl group containing from about 6 to 12 carbon atoms in either a straight chain or branched chain configuration, with ethylene oxide, the said ethylene oxide being present in amounts equal to 10 to 60 moles of ethylene oxide per mole of alkyl phenol. The alkyl substituent in such compounds can be derived from polymerized propylene, diisobutylene, octane, or nonane, for example.

Polyethylene gycol/polypropylene glycol block copolymers. Those derived from the condensation of ethylene oxide with the product resulting from the reaction of propylene oxide and ethylene diamine products which can be varied in composition depending upon the balance between the hydrophobic and hydrophilic elements which is desired. For example, compounds containing from about 40% to about 80% polyoxyethylene by weight and having a molecular weight of from about 5,000 to about 11,000 resulting from the reaction of ethylene oxide groups with a hydrophobic base constituted of the reaction product of ethylene diamine and excess propylene oxide, said base having a molecular weight of the order of 2,500 to 3,000, are satisfactory.

Fatty alcohol and fatty acid ethoxylates. The condensation product of aliphatic alcohols having from 8 to 18 carbon atoms, in either straight chain or branched chain configuration with ethylene oxide, e.g., a coconut alcohol ethylene oxide condensate having from 10 to 30 moles of ethylene oxide per mole of coconut alcohol, the coconut alcohol fraction having from 10 to 14 carbon atoms. Other ethylene oxide condensation products are ethoxylated fatty acid esters of polyhydric alcohols (e.g., Tween 20-polyoxyethylens (20) sorbitan monolaurate).

Long chain tertiary amine oxides. Long chain tertiary amine oxides corresponding to the following general formula:

$R_1R_2R_3N \rightarrow O$ wherein $R_1$ contains an alkyl, alkenyl or monohydroxy alkyl radical of from about 8 to about 18 carbon atoms, from about 0 to about 10 ethylene oxide moieties, and from 0 to 1 glycerol moiety, and $R_2$ and $R_3$ contain from 1 to about 3 carbon atoms and from 0 to about 1 hydroxy group, e.g., methyl, ethyl, propyl, hydroxy ethyl, or hydroxy propyl radicals. The arrow in the formula is a conventional representation of a semipolar bond. Examples of amine oxides suitable for use in this invention include dimethyldodecylamine oxide, oleyldi(2-hydroxy ethyl) amine oxide, dimethyloctylamine oxide, dimethyldecy-lamine oxide, dimethyltetradecylamine oxide, 3,6,9-trioxaheptadecyldiethylamine oxide, di(2-hydroxyethyl)-tetradecylamine oxide, 2-dodecoxyethyldimethylamine oxide, 3-dodecoxy-2-hydroxypropyldi(3-hydroxypropyl) amine oxide, dimethylhexadecylamine oxide.

Alkyl polvsaccharide (APS) surfactants such as the alkyl polglycosides. Such surfactants are APS surfactants having a hydrophobic group with about 6 to about 30 carbon atoms and polysaccharide (e.g., polyglycoside) as the hydrophilic group. Optionally, there can be a polyalkylene-oxide group joining the hydrophobic and hydrophilic moieties. The alkyl group (i.e., the hydrophobic moiety) can be saturated or unsaturated, branched or unbranched, and unsubstituted or substituted (e.g., with hydroxy or cyclic rings).

Polyethyle glycol (PEG) glycerol fatty esters, such as those of the formula $R(O)OCH_2CH(OH)CH_2(OCH_2CH_2)_nOH$ wherein n is from about 5 to about 200, preferably from about 20 to about 100, and R is an aliphatic hydrocarbyl having from about 8 to about 20 carbon atoms.

Alcoholic Composition:

The alcoholic composition consisting essentially of one or more alcohols with two or more hydroxy groups per molecule present in the anhydrous flavor delivery system according to the present invention preferably comprises at least one polyhydric alcohol with between three and eight carbon atoms per molecule. As already mentioned above, the term "alcoholic composition" characterizes individual, or combinations of, alcohols.

The most prefered polyhydric alcohols are those with three, four, five or six carbon atoms per molecule.

Propylene glycol, butylene glycol and hexylene glycol are the most prefered alcohols and can be used alone and/or in mixture with other alcohols possessing two or more hydroxy groups per molecule.

Other prefered alcohols are glycerol and sorbitol.

In anhydrous flavor delivery systems according to the present invention very often the flavoring composition and the alcoholic composition have a very low solubility in each other. In these cases, when the flavoring and the alcoholic composition are mixed in a weight ratio to each other of 0.2–2.0, in absence of the surfactant system a two-phase-system is obtained.

Other Additive:

As already mentioned, the anhydrous flavor delivery system of the present invention may contain, on an optional basis, up to 10% by weight of at least one other additive typically used in flavor and/or food manufacturing. In particular, the following food grade additives can be used:

preservatives, colorants, salt, intense sweeteners (natural and artificial).

The flavor delivery system according to the invention can be used to produce a beverage or food product which is unexpectedly flavor stabilized. In beverages, the flavor delivery system is remarkably stable as compared to conventional systems at lower pH-values. E.g., when the flavor composition contains citrus oils and the flavor delivery system is added to a beverage containing an acidulant such as citric acid, the rate of degredation (i.e the rate of development of off-notes) is decreased in comparison with control samples.

The following examples are merely illustrative of the present invention are not intended as a limitation upon the scope thereof.

In each of the following examples 1–20 for preparation of the flavor delivery system the surfactant(s) constituting the surfactant system are warmed to liquefy them, if necessary, and then the flavoring ingredient(s) constituting the flavoring composition are added. These are gently mixed for about ten minutes to ensure an adequate mixing.

The alcoholic composition consisting essentially of polyhydric alcohol(s), was then added and the resulting mixture mixed for an additional ten minutes. The resulting system is a clear liquid. The system may gel when refrigerated, but the gel will liquefy without any mixing when brought back to room temperature.

For each example, the percentage of each ingredient refers to the percentage of the material added by weight.

For each example, three substances are listed, the first substance being a typical flavorant, the second substance being a typical surfactant, and the third substance being a typical polyhydric alcohol for use in the flavor delivery system of the present invention.

The titles assigned to the examples are not meant to imply that the examples give recipes of commercially relevant flavor delivery systems, They primarily serve to demonstrate the capacity of the flavor delivery systems to incorporate the various chemical classes. For commercial products, the use of single flavor ingredients would not be typical. Further flavoring ingredients typical for the respective flavor can be added along with the flavorant stated in the respective example.

EXAMPLE 1

Cherry Flavor Delivery System

20% Benzaldehyde CAS #100-52-7

40% Polysorbate 80 (Polyoxyethylene 20 sorbitan monooleate, CAS #9005-65-6)

40% Butylene glycol (Butane-1,3-diol, CAS #107-88-0)

EXAMPLE 2

Cocoa Flavor Delivery System

30% 5-Methyl-2-phenyl-2-hexenal -(CAS #21834-92-4)
30% Polysorbate 60 (Polyoxyethylene 20 sorbitan monostearate, CAS #9005-67-8)
40% Propylene glycol (Propane-1,2-diol CAS #57-55-6)

EXAMPLE 3

Green Apple Flavor Delivery System

15% Cis-3-hexanol (Z-hexan-3-ol CAS #623-37-0)
35% Polysorbate 60
50% Propylene glycol

EXAMPLE 4

Honey Flavor Delivery System

30% Phenyl ethyl alcohol (2-Phenylethanol CAS #60-12-8)
20% Polysorbate 60
50% Propylene glycol

EXAMPLE 5

Butter Flavor Delivery System

40% Diacetyl (Butane-2,3-dione CAS #431-03-8)
40% Polysorbate 80
20% Glycerol (1,2,3-Propanetriol CAS #56-81-5)

EXAMPLE 6

Grape Flavor Delivery System

30% Ethyl butyrate (Butanoic acid ethyl aster CAS #105-54-4
20% Polysorbate 20
40% Hexylene glycol (2-methyl-2,4-pentandiol, CAS #9005-65-6)

EXAMPLE 7

Honey Flavor Delivery System

30% Ethyl phenyl acetate (Acetic acid, phenyl-, ethyl ester 8CI, CAS #101-97-3)
40% Polysorbate 60
30% Propylene glycol

EXAMPLE 8

Cheese Flavor Delivery System

20% Butyric acid (Butanoic acid CAS #107-92-6)
40% Tween 80 (CAS #9005-65-6)
40% Hexylene glycol

EXAMPLE 9

Cheese Flavor Delivery System

30% Capric acid (Decanoic acid CAS #334-48-5)
30% A blend of 80% Polysorbate 20 and 20% Drewpol 10-10-0 (trademark of Stephan Company, a mix of Decaglycerol Decaoleate CAS #11094-60-3 and Oleic acid CAS #112-80-1)
40% Propylene glycol

EXAMPLE 10

Orange Flavor Delivery System

16% Orange oil Valencia five fold (CAS #68514-75-0)
38% Polysorbate 80
46% Hexylene glycol

EXAMPLE 11

Lime Flavor Delivery System

25% Lime oil distilled (CAS #8008-26-2)
25% Polysorbate 60
50% A blend of 90% Hexylene glycol and 10% sorbitol (d-1,2,3,4,5,6-hexanehexol CAS #50-70-4)

EXAMPLE 12

Lemon Flavor Delivery System

22% Lemongrass oil (CAS #8007-02-1)
35% Polysorbate 60
42% Propylene glycol

EXAMPLE 13

Grape Flavor Delivery System

20% Artificial Grape Flavor
30% Polysorbate 60
50% Propylene glycol
The Artificial Grape Flavor consists of the following Ingredients:
  48% Ethyl butyrate
  34% Methyl anthranilate (CAS #134-20-3)
  10% Ethyl iso valerate (Butanoic acid, 3 methyl-, ethyl ester CAS #108-64-5)
  3% Amyl butyrate (Butanoic acid, pentyl ester CAS #540-18-1)
  2% Ethyl maltol (2-Ethyl-3-hydroxy-4-pyrone CAS #4940-11-8)
  1% Fusel oil (CAS #8013-75-0)
The flavor is made by dissolving the crystals of ethyl maltol in the other ingredients.

EXAMPLE 14

Orange Flavor Delivery System

18% Orange flavor
36% Polysorbate 60
46% Propylene glycol
The orange flavor consists of the following ingredients:
  53% Orange oil five fold
  19% Orange oil single fold
  9% Mandarin oil (CAS #8008-31-9)
  9% Acetaldehyde (Ethanal, CAS #75-07-0)

6% Lime oil distilled
2% IsoAmyl acetate (Isopentyl acetate CAS #123-92-2)
1% 1-Decanal CAS #112-31-2
1% 1-Octanal CAS #124-13-0

The orange flavor is made by blending together all the ingredients.

EXAMPLE 15

Punch Flavor Delivery System

35% Punch flavor
40% Polysorbate 60
25% Propylene glycol

The punch flavor consists of the following ingredients;

42% Lemon oil single fold (CAS #8008-56-8)
30% Lemon oil 5 fold
20% Orange oil 5 fold
5% Benzaldehyde
2% Citral (3,7-Dimethyl-2,6-octadicnal, CAS #5392-40-5)
1% Vanillin CAS #121-33-5

The flavor is made by dissolving the crystals of vanillin In the other ingredients.

EXAMPLE 16

Lemon Flavor Delivery System

20% Citral (CAS #5392-40-5)
30% Polysorbate 60
40% Propylene glycol

EXAMPLE 17

Lemon Flavor Delivery System

25% Lemon oil single fold California type
40% Polysorbate 60
35% Propylene glycol

EXAMPLE 18

Fruit Flavor Delivery System

20% Fruit flavor
40% Drewmulse GMC-8 (trademark of Stephan Company, a blend of glycerol monoesters of C8, C10 fatty acids.
40% Propylene glycol The fruit flavor consists of a blend of the following ingredients:

30% Orange oil single fold
20% Benzaldehyde
20 Lemon oil single fold
10% Lime oil CP expressed
4% Ethyl butyrate
4% Ethyl caproate (Hexanoic acid ethyl ester CAS #8068-81-3)
4% Linalool (3,7-Dimethyl-1,6-octadien-3-ol CAS #11204-20-7)
3% TsoAmyl acetate
2% Vanillin
1% Maltol (3-Hydroxy-2-methyl-4-pyrone CAS #118-71-8)
1% Methyl cinnamate (Cinnamic acid, methyl ester CAS #103-26-4)
1% Gamma decalactone (Decan-4-olide CAS #706-14-9)

The punch flavor is manufactured by dissolving the vanillin and maltol in the other ingredients with good mixing.

EXAMPLE 19

Butter Flavor Delivery System

35% Butter flavor
35% Polysorbate 60
30% Propylene glycol

The butter flavor consists of a blend of the following ingredients:

68% Diacetyl
15% Delta decalatone (Decan-5-olide CAS # 705-86-2)
6% Butyric Acid
5% Butyl butyryl lactate (Butanoic acid, 2 butoxy-1-methyl-2-oxoethyl ester CA8 # 7492-70-8)
6% A mixture of acids, ester and lactones commonly used in butter flavors, each present in this formula at less than 1% to the finished butter favor.

The butter flavor was prepared by a simple blending of the ingredients.

EXAMPLE 20

Orange Flavor Delivery System

20% Orange oil single fold
35% Polysorbate 60
45% Propylene glycol

Some of the above flavor delivery systems according to the examples 1–20 were used in tests to demonstrate the advantages the flavor delivery system of the present invention has versus traditional flavor delivery (solvent) systems.

EXAMPLE 21

Greater Retention of Flavor Ingredients in High Heat Applications

The punch flavor defined in Example 15 was diluted in soybean oil at the same rate as it was incorporated into the flavor delivery system of Example 15; i.e. both flavor systems contained 35% punch flavor.

Both flavor systems were then separately applied at 0.2% (i.e. 0.2 g per 100 grams of finished cereal) to the following sugar slurry, this slurry being representative of the slurries typically used in the manufacture of breakfast cereals.

70% Sugar
15% High fructose corn syrup 42 DE
13% Water
2% Soybean oil

The above mixture was heated to 110° C. (degrees Celsius), at this temperature the mixture balls and the sugar is completely dissolved. The sugar slurry was then allowed to cool to 85° C., at which time the flavor was added to the slurry at a rate of 0.2%. The slurry was mixed to ensure an even distribution of flavor.

The above sugar slurry with the flavor was kept at a temperature of 85° C. to prevent crystallization of the sugar and was then sprayed onto rice ceral using compressed air. In doing so, 33 grams of the sugar slurry and flavor mixture was applied to 67 grams of rice cereal.

The resulting cereal/slurry mixture was then dried in a convection oven at 120° C. for 16 minutes. When dry, the two cereals were panel tested.

The panel consisted of 27 panelists, The samples were served in a completely balanced randomized design. The panelists were asked to evaluate the two cereals and answer the following questions using a scale of 1–9:

A.) Rate the Intensity of the sweetness of the samples

B.) How much do you like the fruit flavor of the samples?

C.) How would you rate the fruit flavor intensity of the samples?

Results of the Evaluation:

| | | |
|---|---|---|
| i.) | For the sweetness of the samples (question A): | |
| | Traditional delivery system (oil) = | 5.22 |
| | Flavor delivery system (invention) = | 5.59 |
| | Thus there is no significant difference. | |
| ii.) | For the liking of the fruit flavor profile (question B): | |
| | Traditional delivery system = | 5.65 |
| | Flavor delivery System (Invention) = | 6.00 |
| | Thus, there is no significant difference | |
| iii.) | For the fruit flavor intensity (question C): | |
| | Traditlonal delivery system = | 5.07 |
| | Flavor delivery system = | 6.37 |
| | This is a significant difference at the 95% confidence level. | |

This is a significant difference at the 95% confidence level.

Conclusion:

The flavor delivery system of Example 15 did not alter the basic sweetness or fruit flavor profile when compared with the traditional delivery system.

However, even though the two flavor systems delivered the same amount of flavor components, the flavor delivery system of the present invention clearly delivered a greater flavor intensity. One possible explanation is that the flavor delivery system is reducing the amount of flavor lost during the drying of the cereal.

EXAMPLE 22

Better Retention of Flavor Ingredients After Storage in Microwave Popcorn

Introductory Remark:

The tendency of butter flavored microwave popcorn to lose flavor on storage is a problem for the industry. Many of the ingredients typically used in butter flavors, such as diacetyl, migrate from the popcorn/oil matrix into the surrounding packaging material. This loss of flavor occurs at a faster rate as the storage temperature increases. The result is a product that is weaker in butter flavor, this results in a reduced consumer acceptance of the stored product.

Traditionally the approach to overcome this loss of flavor has been to increase the amount of flavor that is used, This has not yielded completely satisfactory results, the greater levels of flavor results in more flavor migrating into the packaging material. This migration of flavor into the packaging eventually results in the butter odor escaping the package, an undesirable development.

Other approaches have been tried, for example, cyclodextrin has been used in an attempt to reduce the migration of the butter flavor. This approach has yielded some interesting results, but their expense and relatively low level of flavor that can be incorporated limit the use of cyclodextrins.

The butter flavor defined in Example 19 was diluted in soybean oil at the same rate as it was incorporated into the flavor delivery system of Example 19; i.e. both flavor systems contained 35% butter flavor.

Both flavor systems were then separately applied at 0.4% to a popcorn, salt and oil mixture (0.4 g flavor per 100 g finished popcorn—salt, corn, oil). Each batch of flavored popcorn was further divided into two sets, one was stored at room temperature (22 degrees Celsius), and the other set was stored in a freezer at −20 degrees Celsius.

The popcorn samples were stored for twelve weeks. The bags of popcorn were then freshly popped in a 600-watt microwave. A panel of popcorn consumers was then asked to evaluate each flavor system separately, comparing the samples stored in the freezer against the sample stored at room temperature. The samples were coded to keep the identity of the samples from the panelists.

The panelists were asked to rate the popcorn samples on a scale of 1 to 9 for flavor intensity and for overall degree of flavor acceptability The panelists were also asked to select their preferred sample. Results of the taste evaluation:

Control (oil) sample stored in the freezer—intensity rating of 5.92, and acceptability rating of 6.72. 84% of the panelists preferred this sample to the room temperature sample.

Control (oil) sample stored at room temperature—intensity rating of 4.72, and acceptability rating of 5.96. 16% of the panelists preferred this sample to the sample stored in the freezer.

The taste results showed a significant difference in flavor intensity, preference and acceptability between the freezer stored sample and the room temperature sample for the control flavor system.

Test (using the flavor delivery system) sample stored in the freezer—intensity rating of 5.31, and acceptability rating of 6.38. 55% of the panelists preferred this sample to the room temperature sample.

Test (using the flavor delivery system) sample stored at room temperature—intensity rating of 5.38, and acceptability rating of 6.17. 45% of the panelists preferred this sample to the sample stored In the freezer.

The taste results showed no significant difference in flavor intensity, preference and acceptability between the freezer stored sample and the room temperature sample for the test using the flavor delivery system. Conclusion:

Based on the results of the panel test, it appears that the flavor delivery system reduced the loss of flavor intensity during storage.

EXAMPLE 23

Slower Development of Off Notes in Highly Acidic Beverages

Introductory remark:

It is well known that flavors in a beverage undergo a number of changes during storage. Some of these changes lead to the development of off flavors and a reduction in desirable taste intensity. A classic example of flavor degradation during storage occurs when flavors containing citrus oils are added to beverages containing an acidulant such as citric acid. The rate of degradation increases as the level of acidity increases, or when the beverage is stored at elevated temperatures.

To test the possibility that the flavor delivery system could slow the degradation of flavor in beverage, three representative flavoring compositions were selected for study. Orange oil single fold Florida, lemon oil single fold California type and citral were selected because of their well known instability in acidic beverages. These flavoring compositions (ingredients) were then (a) incorporated into the flavor delivery system of the present invention, and (b) were also diluted in ethyl alcohol for use as a control reference.

For all of the following studies, the flavoring was added to a beverage that contained 0.35% citric acid, 10% sugar and 89.65% water. After the flavor was added to the beverage, the beverage was hot packed to prevent microbiological growth. The beverages were then stored at 38° C. until needed for evaluation.

A panel of flavor chemists was selected to evaluate the products. For each evaluation, the panelist was given a sample of beverage that was prepared that day for use as a reference. The taster was told to assign a hedonic rating of 10 (on a scale of 1 to 10) to the freshly prepared sample. The taster was told that a hedonic rating of four or less meant that the taster considered the flavor profile of the product to be unacceptable. The taster was also given two bottles of stored beverage to taste compare to the freshly prepared reference. The additional bottles were coded so that the taster would not know the identity of the stored sample.

Cultral study:

For the citral study, citral was incorporated into the flavor delivery system as shown in Example 16. As a reference, the same lot of citral was dissolved in ethyl alcohol at a level of two percent. The citral dissolved in the alcohol was applied to the beverage at 0.125% (w/w) to achieve a final citral concentration in the beverage of 25 parts per million (ppm). The citral incorporated in the flavor delivery system of Example 16 was added to the beverage at 0.0125% to yield a final citral concentration in the beverage of 25 ppm.

The evaluations yielded the following results:

| Weeks | 1 | 2 | 3 | 4 | 5 | 6 |
|---|---|---|---|---|---|---|
| Rating for the control sample | 3.9 | 3.0 | 3.2 | 2.2 | 2.6 | 1.3 |
| Rating for Example 16 sample | 6.8 | 5.1 | 4.2 | 3.7 | 4.1 | 3.6 |

Orange Oil Study:

For the orange oil study, orange oil single fold was incorporated into the flavor delivery system as shown in Example 20. As a reference, the same lot of orange oil was dissolved in ethyl alcohol at a level of two percent. The orange oil dissolved in the alcohol was applied to the beverage at 0.25% (w/w) to achieve a final orange oil concentration in the beverage of 50 parts per million (ppm). The orange oil incorporated in the flavor delivery system of Example 20 was added to the beverage at 0.025% to yield a final orange oil concentration in the beverage of 50 ppm.

The evaluations yielded the following results:

| Weeks | 1 | 2 | 3 | 4 | 6 |
|---|---|---|---|---|---|
| Rating for the control sample | 8.0 | 5.5 | 5.0 | 4.0 | 2.0 |
| Rating for Example 20 sample | 9.2 | 8.1 | 6.6 | 6.8 | 3.9 |

Lemon Oil Study:

For the lemon oil study, lemon oil single fold was incorporated into the flavor delivery system as shown in example 17. As a reference, the same lot of lemon oil was dissolved in ethyl alcohol at a level of two percent. The lemon oil dissolved In the alcohol was applied to the beverage at 0.40% (w/w) to achieve a final lemon oil concentration in the beverage of 80 parts per million (ppm). The lemon oil incorporated in the flavor delivery system of example 17 was added to the beverage at 0.032% to yield a final lemon oil concentration in the beverage of 80 ppm.

The Evaluations Yielded the Following Results:

| Weeks | 1 | 2 | 3 | 4 | 6 |
|---|---|---|---|---|---|
| Rating for the control sample | 7.0 | 5.0 | 3.7 | 2.9 | 2.3 |
| Rating for Example 17 sampe | 7.0 | 6.4 | 5.8 | 4.2 | 4.2 |

For each of the three studies the taste results indicate incorporating the flavor ingredients in the flavor delivery system slowed the rate of flavor degradation.

Because the results of these tests were positive the lemon flavor in example 17 underwent additional testing (see Example 24).

EXAMPLE 24

Additional Testing of the Lemon flavor delivery system in a highly acidic beverage For the additional test the lemon beverages were prepared as in Example 23, but were stored at 22 degrees Celsius. The panel consisted of lemonade consumers. The panelists were given the two samples (one control and one sample comprising the flavor delivery system of example 17) to taste. The samples were served In a completely balanced randomized design. The panelists were asked to evaluate the two samples and choose their preferred sample. They were also asked to Indentify which sample had the better lemonade aftertaste. The panelists were given samples that were stored for four, eight and twelve weeks.

Results of the Panel Tests:

| Weeks | 4 | 8 | 12 |
|---|---|---|---|
| Preferred the control | 20% | 30% | 45% |
| Preferred sample 17* | 80% | 70% | 55% |
| Preferred aftertaste of the control | 30% | 30% | 40% |
| Preferred aftertaste of the sample 17* | 70% | 70% | 80% |

*"sample 17" indicates the sample comprising the flavor delivery system of example 17

Again the samples containing the flavor delivery system of example 17 were preferred. As in the previous examples it appears that the flavor delivery system of the invention slows the rate of change.

What is claimed is:

1. An anhydrous flavor delivery system being a clear liquid at a temperature of 300° C., comprising:
   (a) 10–40% by weight of a flavoring composition,
   (b) 20–50% by weight of a surfactant system consisting essentially of one or more surfactants,
   (c) 20–50% by weight of an alcoholic composition consisting essentially of one or more alcohols with two or more hydroxy groups per molecule, and
   (d) 0–10% by weight of at least one other additive typically used in flavor and/or food manufacturing, wherein the total amount of ingredients (a), (b) and (c) is at least 90% by weight.

2. An anhydrous flavor delivery system according to claim 1, characterized In that it comprises 15–30% by weight of said flavoring composition.

3. An anhydrous flavor delivery system according to claim 1, wherein the flavoring composition comprises one or more flavorants selected from the group consisting of
   (a) essential oils,
   (b) alcohols comprising between three and sixteen carbon atoms per molecule,
   (c) aldehydes comprising between three and sixteen carbon atoms per molecule,
   (d) organic acids comprising between three and sixteen carbon atoms per molecule,
   (e) organic esters comprising between three and sixteen carbon atoms per molecule,
   (f) lactones comprising between five and eighteen carbon atoms per molecule, and
   (g) ketones comprising between four and fourteen carbon atoms per molecule.

4. An anhydrous flavor delivery system according to claim 1, wherein said alcoholic composition comprises at least one polyhydric alcohol with between three and eight carbon atoms per molecule.

5. An anhydrous flavor delivery system according to claim 4, characterizedin wherein said alcoholic composition comprises at least one alcohol with three, four, five, or six carbon atoms per molecule.

6. An anhydrous flavor delivery system according to claim 5, characterized in that said alcohol is propylene glycol, butylene glycol, glycerol, hexylene glycol, or sorbitol.

7. An anhydrous flavor delivery system according to claim 1, wherein said surfactant system comprises one or more non-ionic surfactants.

8. An anhydrous flavor delivery system according to claim 1, wherein said surfactant system has a composite HBL value of between 6 and 18.

9. A process of producing an anhydrous flavor delivery system according claim 1, comprising the steps of:
   (a) mixing 10–40 parts by weight of a flavoring composition with 20–50 parts by weight of a surfactant system consisting essentially of one or more surfactants,
   (b) adding 20–50 parts by weight of an alcoholic composition consisting essentially or one or more alcohols with two or more hydroxy groups per molecule to the mixture obtained by step (a), and
   (c) mixing the admixture obtained by step (b).

10. A process of manufacturing a flavored ingestible product, comprising the steps of:
    (a) producing an anhydrous flavor delivery system according to any, and
    (b) adding said anhydrous flavor delivery system to an ingestible product.

11. An anhydrous flavor delivery system according to claim 8, wherein said surfactant system has a composite HBL value of between 9 and 18.

* * * * *